United States Patent [19]
Garrido

[11] Patent Number: 5,924,668
[45] Date of Patent: Jul. 20, 1999

[54] MOTORIZED VEHICLE SEAT LIFT MECHANISM

[75] Inventor: Pascal Garrido, Gravehurst, Canada

[73] Assignee: Meritor Automotive Canada, Inc., Ontario, Canada

[21] Appl. No.: 09/032,285

[22] Filed: Feb. 26, 1998

[51] Int. Cl.$^6$ .................................................. F16M 13/00
[52] U.S. Cl. .......................................... 248/419; 74/89.14
[58] Field of Search .................................. 248/419, 157, 248/420, 421, 422, 405; 310/83; 464/180; 74/89.14

[56] References Cited

U.S. PATENT DOCUMENTS

| | | |
|---|---|---|
| 2,868,271 | 1/1959 | Pickels . |
| 2,875,809 | 3/1959 | Ragsdale et al. . |
| 2,905,228 | 9/1959 | Latimer . |
| 2,924,265 | 2/1960 | Himka . |
| 2,930,428 | 3/1960 | De Rose . |
| 2,939,513 | 6/1960 | Leslie et al. . |
| 3,240,464 | 3/1966 | Pickels . |
| 3,437,302 | 4/1969 | Homier . |
| 3,568,972 | 3/1971 | Sherman . |
| 4,015,812 | 4/1977 | Heesch . |
| 4,174,088 | 11/1979 | Schaefer et al. ........................ 248/395 |
| 4,949,585 | 8/1990 | Dauvegne et al. . |
| 5,144,738 | 9/1992 | Oyafuso ................................. 310/90 X |
| 5,222,710 | 6/1993 | White et al. ............................ 248/422 |
| 5,299,771 | 4/1994 | White et al. . |
| 5,337,995 | 8/1994 | Satoh et al. ......................... 248/421 X |
| 5,573,219 | 11/1996 | Chinomi ................................ 248/421 |
| 5,709,363 | 1/1998 | Matsuhashi ........................... 248/421 |
| 5,738,327 | 4/1998 | Tanaka et al. ......................... 248/419 |
| 5,777,411 | 7/1998 | Nakajima et al. ....................... 310/83 |

*Primary Examiner*—Ramon O. Ramirez

[57] ABSTRACT

A vehicle seat lift mechanism includes a motor assembly that is used to adjust the height position of the vehicle seat. The motor assembly includes a motor shaft that is maintained within a housing that includes a damper member that is deformed during the assembly process. The damper member eliminates axial play within the motor assembly. The motor shaft includes rounded contours on the ends of the shaft that interact with disk-like bearing plates to effectively eliminate friction during motor operation.

20 Claims, 4 Drawing Sheets

MOTORIZED VEHICLE SEAT LIFT MECHANISM

BACKGROUND OF THE INVENTION

This invention generally relates to a motorized system for adjusting the height of a vehicle seat and an associated linkage assembly.

A variety of vehicle seats are commercially available. In many instances, it is desirable to provide a seat occupant with the ability to adjust the angle of the seat back and the height and position of the seat base relative to the floor of the vehicle. A variety of manually operated and automatic seat adjustment mechanisms are available.

A major drawback associated with most automated seat adjustment mechanisms is that they include relatively expensive components, which increases the cost of the seat and the vehicle to the consumer. Another shortcoming of currently available systems is undesirable noise during operation of the seat adjustment mechanism. One cause of this noise is axial play within a motor housing that allows the internal components to move during operation, especially when reversing the direction of motor operation. Such noise is undesirable because it can be annoying or bothersome to a seat occupant. Further, the axial play within conventional systems also allows for the possibility of undesirable wear on the moving parts, which ideally are kept in a desired alignment throughout the life of the mechanism.

Another problem associated with prior seat adjustment designs is the arrangement of components that allow the seat height to be adjusted. There is limited space available beneath a seat in a typical vehicle and designers face the challenge of providing a stable, reliable and secure support system that is not overly bulky or complicated. The challenge is to provide such a system that enables a seat occupant to adjust the seat in a variety of directions to achieve greatest comfort while meeting the design criteria just mentioned.

This invention provides a unique motor assembly arrangement that avoids the shortcomings and drawbacks of the prior art described above. Further, this invention provides a unique linkage arrangement that cooperates with the inventive motor assembly to provide a versatile seat height adjustment device.

SUMMARY OF THE INVENTION

In general terms, this invention is a seat lifting device for automatically adjusting the height and position of a seat within a vehicle. The device preferably is motorized and the motor includes several basic components. A motor shaft has a first axial end and a second axial end. A motor selectively causes the shaft to rotate. A gear housing receives the first end of the shaft while an end cap receives the opposite, second end of the shaft. A cover extends between the gear housing and the end cap. A damper is positioned between the end cap and the second shaft end such that the shaft is prevented from moving axially within the device when the cover is appropriately connected with the end cap and the gear housing.

In the preferred embodiment, the motor shaft has rounded ends that cooperate with disk-like members positioned adjacent the ends of the shaft. The rounded ends, which preferably have a semi-spherical shape, act as thrust bearings in cooperation with the disk-like bearing plates. Friction is minimized as the motor shaft rotates because the rounded ends of the shaft and the bearing plates have a single-point contact. This arrangement is especially advantageous compared to prior designs, which relied upon relatively expensive plug arrangements or ball bearing assemblies.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
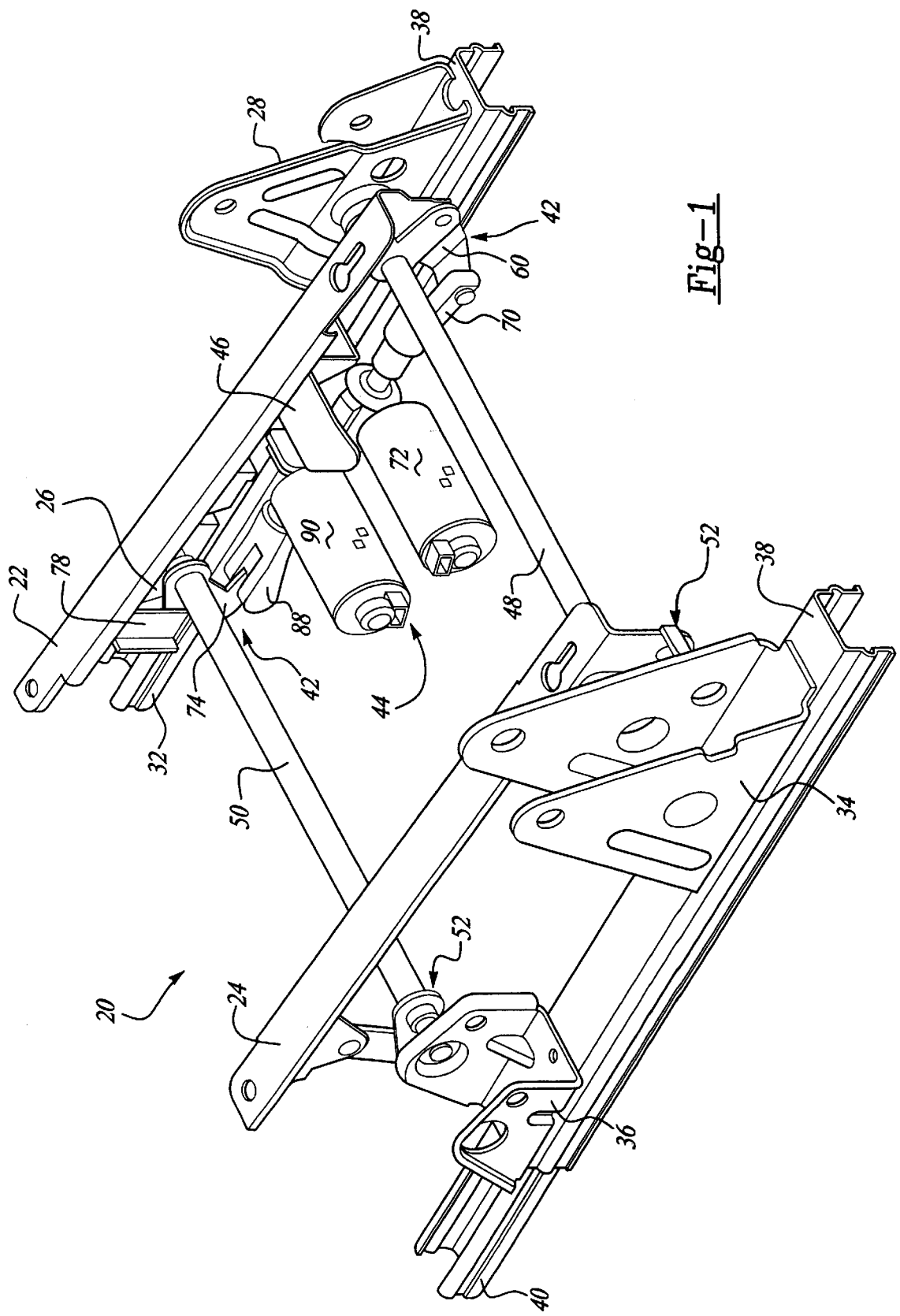
FIG. 1 is a diagrammatic, perspective illustration of a seat lift mechanism designed according to this invention.

FIG. 1 diagrammatically illustrates a seat lift assembly 20. A pair of seat support brackets 22 and 24 are adapted to be secured to the bottom of a seat base portion of a vehicle seat (not illustrated). The bracket 22 is supported by mounting brackets 26 and 28, which are secured to a seat track 30. A second seat track 32 is secured to the floor of the vehicle in a conventional manner. The seat track 30 can move relative to the seat track 32 to adjust a forward position of the seat within the vehicle. Similarly, the seat support bracket 24 is supported by the mounting brackets 34 and 36 on a seat track 38, which is moveable relative to a seat track 40 that is secured to the floor of the vehicle.

A linkage assembly 42 provides the connection between the seat support bracket 22 and the mounting brackets 26 and 28, respectively. A motor assembly 44 is supported on the seat track 30 by a motor mounting bracket 46 so that the linkage assembly 42 and the motor assembly 44 move with the seat track 30 whenever a seat occupant adjusts the forward position of the seat.

Since the motor assembly 44 is only on one side of the device 20, a pair of stabilizer bars 48 and 50 connect the two sides of the device. The bars 48 and 50 provide for a coordinated positioning of the seat support bracket 24 with the position of the seat support bracket 22, which is dictated by the operation of the motor assembly 44 and the corresponding orientation of the linkage assembly 42. A linkage assembly 52 is provided in association with the seat support bracket 24 so that consistent positioning is achievable.

Figure 2:
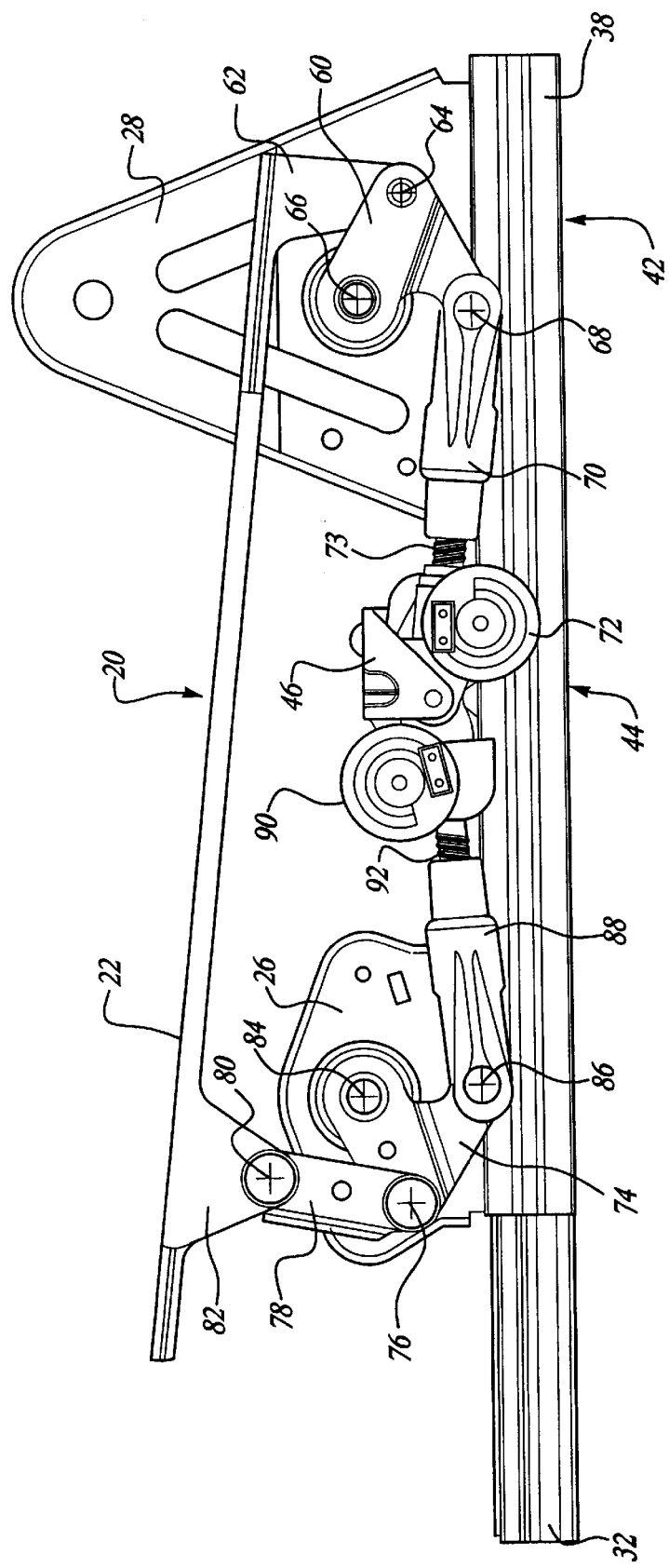
FIG. 2 is a side plan view of the right side of the embodiment of FIG. 1.

FIG. 2 illustrates the right hand side of FIG. 1 (according to the drawing) in plan view. The linkage assembly 42 includes a first link member 60 that is connected with an extension 62 at one end of the seat support bracket 22. The connection between the link member 60 and the seat support bracket 22 preferably is pivotable so that the two pieces pivot relative to each about the pivot axis 64. The link member 60 is pivotably supported on the bracket 28 for pivotable movement about a pivot axis 66. The connection between the link member 60 and the bracket 28 preferably is at one end of the link member 60. The link member 60 preferably is generally L-shaped as illustrated. The opposite end of the link member 60 is connected with the motor assembly 44. Preferably a pivotable connection provides pivotable movement about a pivot axis 68 between the link member 60 and a moving member 70 of the motor assembly 44.

The moving member 70 moves generally from left to right (according to the drawing) whenever a motor 72 is selectively activated. A spindle member 73 preferably is threaded on its outer surface and cooperates with an inside threaded surface on the moving member 70 so that rotation of the spindle member 73 causes the appropriate movement of the moving member 70. Further details regarding the motor assembly 44 are given below.

At the opposite end of the seat support bracket 22 a link member 74 cooperates through a pivotal connection at 76 with another link member 78. A pivotal connection at 80 interconnects the link member 78 with an extension 82 of the seat support bracket 22. The link member 74 preferably is generally L-shaped similar to the link member 60. The link member 74 is pivotally supported on the mounting bracket 26 for pivotable movement about a pivot axis 84. The pivotal cooperation between the link members 74 and 78 allow for further refined adjustment of the position of the left (according to the drawing) end of the seat support bracket 22 and, therefore, the adjusted position of the seat.

The link member 74 is connected at 86 to a moving member 88, which is similar to the moving member 70. The connection at 86 preferably is a pivotal connection allowing the link member 74 to pivot relative to the moving member 88 as may be required during a seat position adjustment. A second motor 90 and a second spindle member 92 provide the motive force for moving the moving member 88 as desired.

The mechanism for actuating the motors 90 and 72 can be any conventional switching arrangement that is positioned within the vehicle to provide easy access to a seat occupant. As described below, the motor 72 and 90 preferably are electric motors and, therefore, a conventional electric switching arrangement is useful.

The linkage arrangement 52 associated with the seat support bracket 24 preferably is configured to follow the movement of the linkage assembly 42 as caused by the motor assembly 44. The connecting bars 48 and 50 ensure that the seat support brackets 22 and 24 are generally parallel to each other at all times, which ensures an appropriate position of the seat base within the vehicle.

Figure 3:
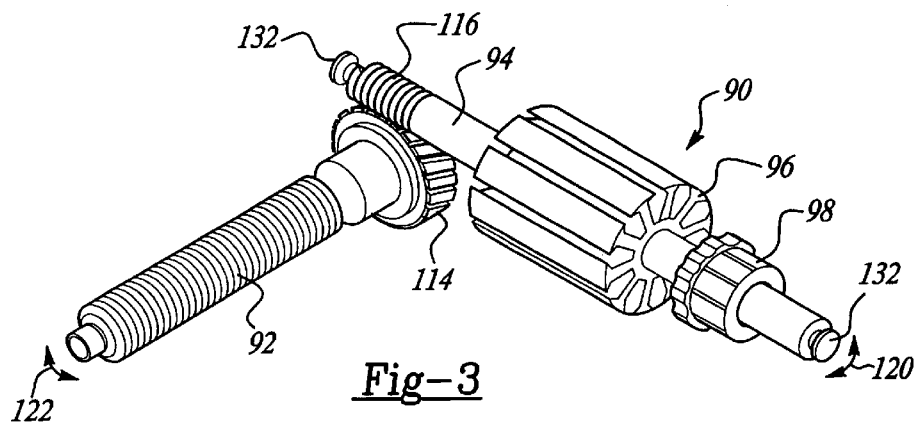
FIG. 3 is a perspective, diagrammatic illustration of selected components of a motor assembly designed according to this invention.
Figure 4:
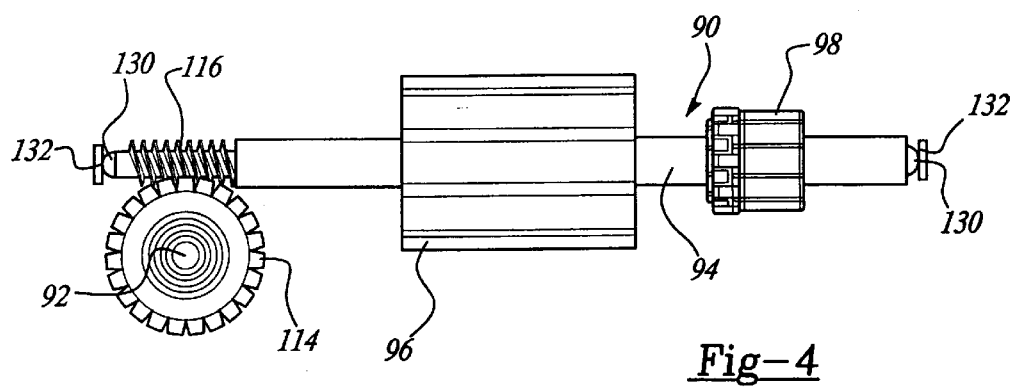
FIG. 4 is a side plan view of the components illustrated in FIG. 3.
Figure 5:
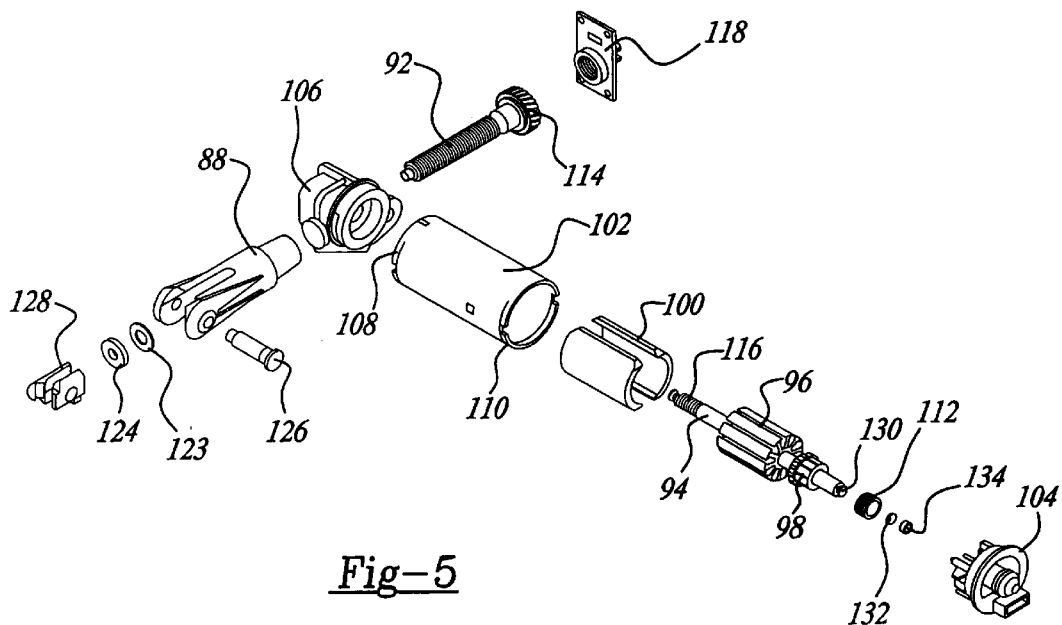
FIG. 5 is an exploded, perspective view of a motor assembly designed according to this invention.

Referring to FIGS. 3 through 5, more details regarding the inventive motor assembly 44 are provided. The motor 90 is illustrated by way of example but the same considerations apply to the motor 72. The motor 90 includes a motor shaft 94 that rotates about its longitudinal axis. A lamination and wire arrangement 96 and a collector 98 are supported on the shaft 94 for rotation with the shaft. A magnet 100 and a stator 102, which also serves as a cover for the motor 90, effectively complete the electric motor portion.

Opposite ends of the shaft 94 are received within an end cap 104 and a gear housing 106, respectively. The cover 102 preferably includes lanced portions 108 and 110 that are crimped onto the gear housing 106 and the end cap 104 to maintain the assembly in a completed configuration.

A bushing member 112 preferably is pressfitted within an appropriate recess in the end cap 104. The motor shaft 94 is received within the bushing 112 during assembly. The bushing 112 maintains the corresponding end of the shaft 94 in a desired alignment for true rotation about its central longitudinal axis. The opposite end of the motor shaft 94 is maintained in position by an appropriately configured recess within the gear housing 106.

The spindle member 92 includes a threaded elongated body portion and a gear member 114 at one end. The gear member 114 interacts with a worm gear portion 116 at one end of the motor shaft 94. The spindle member 92 and its associated gear member 114 are supported in the gear housing 106 and maintained in place by a clevis attaching member 118. The interaction between the portion 116 on the motor shaft 94 and the gear member 114 provides for rotation along generally perpendicular axes. Specifically, as the motor shaft 94 rotates about its central axis as illustrated by the arrows 120, the spindle member 92 rotates about its central longitudinal axis as indicated by the arrows 122. Accordingly, motor activation causes selected rotation of the spindle member 92. The perpendicular arrangement provides the ability to more easily fit the motor assembly in place beneath a seat within a vehicle.

The moving member 88 preferably has a threaded interior surface that cooperates with the external threads on the spindle member 92. As the motor 90 is activated, the moving member 88 is driven along the longitudinal axis of the spindle member 92 by the interaction between the external threads on the spindle member and the internal threads on the moving member 88. A spring washer 123 and a stop washer 124 preferably are positioned along the length of the spindle member 92 to provide an axial stop distal from the gear member 114. The moving member 88 is limited in its movement along the surface of the spindle 92 by the washer combination 124 and 123 at one end and by the interplay between the moving member 88 and the gear housing 106 at the other end. A spring washer 123 preferably is included to provide a soft stop at the furthest position of the moving member 88.

As shown best in FIG. 5, the pivotal connection between the moving member 88 and the link member 74 is accomplished by a pin 126 and an insert tube member 128. The pivotal connection between the moving members and the link members in the preferred embodiment allows for smoother seat position adjustments and reduces strain or wear on the moving parts of the device.

As can be appreciated by those skilled in the art selective activation of the motors 72 and/or 90 will cause corresponding movement of the moving members 70 and 88, respectively. As the moving members move into different positions, they force the link members 74 and 60 into various positions, which results in adjusting the height of the seat support bracket 22. Since the seat support bracket 24 is interconnected with the seat support bracket 22, the two seat support brackets move together and the vehicle seat height is adjusted as desired.

Figure 6:
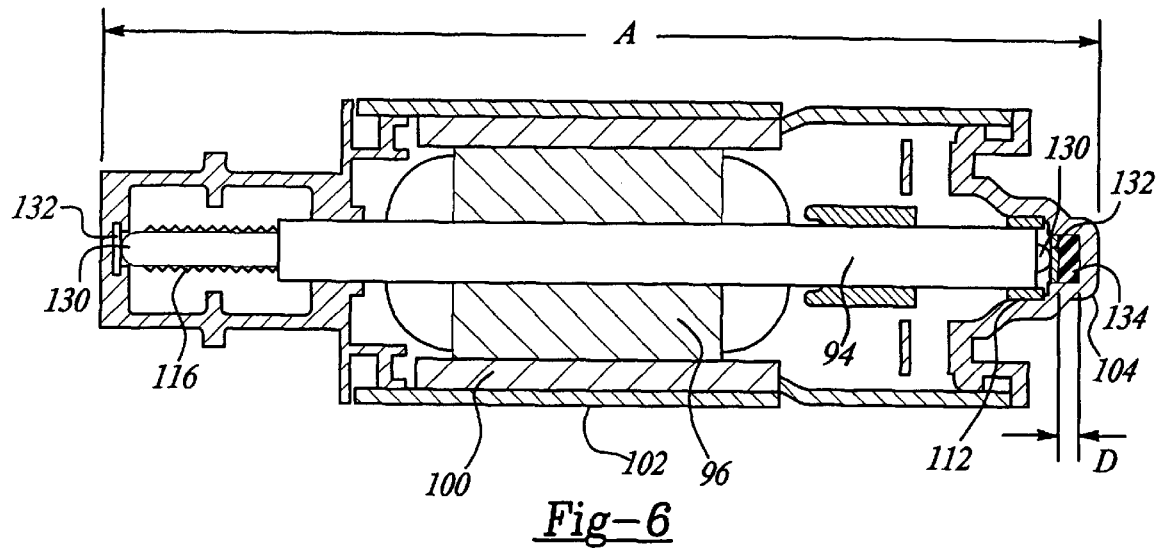
FIG. 6 is cross-sectional illustration of selected components of the embodiment of FIG. 5 in an assembled form.
Figure 7:
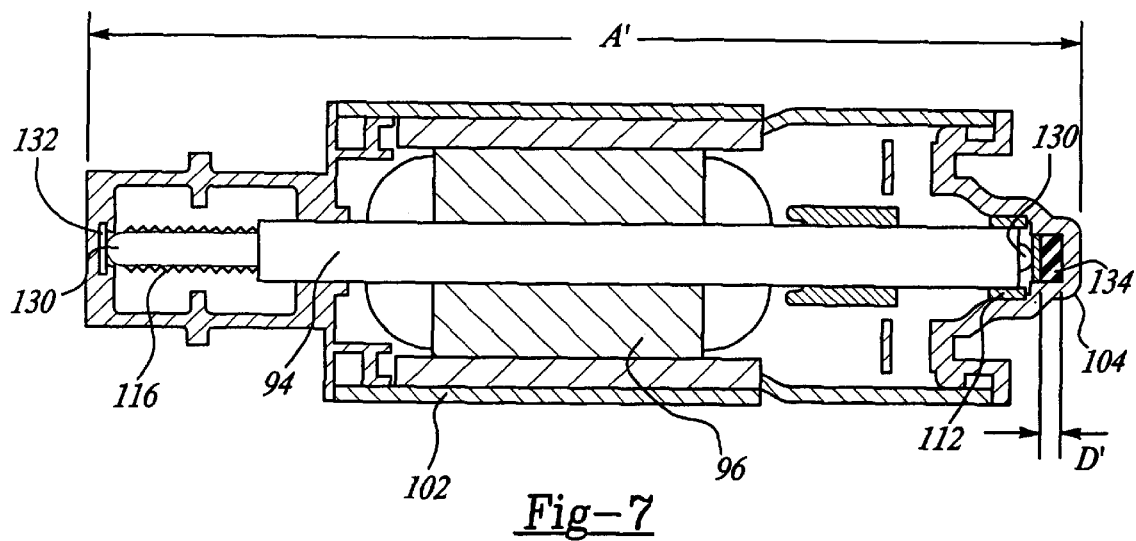
FIG. 7 is another cross-sectional illustration, showing the embodiment of FIG. 6 after performing an assembly operation.

An important feature of the inventive arrangement is best illustrated in FIGS. 4, 6 and 7. Each end of the motor shaft 94 preferably includes a semi-spherical contour. Any rounded edge will suffice but a true semi-spherical contour is preferred. The ends 130 of the motor shaft 94 abut against disk-like bearing plates 132, which are secured in position by the gear housing 106 and the end cap 104, respectively. The interaction between the ends 130 and the bearing plates 132 provides a thrust bearing arrangement having single-point contact. The single-point contact effectively eliminates any friction between the motor shaft 94 and the supporting structure while the motor shaft 94 is rotating. This arrangement is advantageous because it eliminates the need for relatively expensive components that have been proposed or used in other motor designs.

A further feature of this invention is best illustrated in FIGS. 6 and 7. A damper member 134 preferably is provided between the bearing plate 132 and the end cap 104 at the right side (according to the drawing) of the motor. The damper member preferably is disk-like in configuration and is made from any material that has non-elastic or poor elastic properties. Example materials include tin, lead and various plastics. During assembly the various components of the motor are placed in alignment. In the position illustrated in FIG. 6, the overall assembly has an overall length A. In this position, there is axial play that allows the motor shaft 94 to move along its axis within the overall assembly. In the configuration of FIG. 6, the damper member 134 has a thickness D.

During assembly the end cap 104 and the gear housing 106 are forced toward each other and the lanced portions 108 and 10 of the cover 102 are secured to appropriate surfaces of the gear housing 106 and the end cap 104, respectively. During the assembly, while the end cap 104 and the gear housing 106 are forced toward each other, the damper member 134 preferably is deformed. As illustrated in FIG. 7, the overall length of the assembly is A', which is smaller than or shorter than the length A. The length A' is less than the length A because the dimension of the damper member 134 has been reduced from D to D'. The smaller size D' of the damper member 134 was caused by deformation of the damper member during the assembly process. This deformation and snug fit within the overall assembly eliminates axial play within the motor.

Eliminating axial play has the advantage of providing a more secure and reliable arrangement. Further, eliminating axial play eliminates undesirable noise that is typically associated with electric motor assemblies when the motor is reversed from one direction into another. The inventive arrangement provides an economical, reliable and readily implemented solution to the axial play problem that is present in other, less desirable designs.

The foregoing description is exemplary rather than limiting in nature. Variations and modifications to the disclosed embodiment may become apparent to those skilled in the art that do not necessarily depart from the purview and spirit of this invention. The legal scope of protection given to this invention is to be limited only by the following claims.

I claim:

1. An adjustment device for adjusting the height of a seat within a vehicle, comprising:

a motor shaft having a first axial end and a second axial end;

a motor associated with said shaft such that said motor selectively causes said shaft to rotate;

a gear housing receiving said first shaft end;

an end cap receiving said second shaft end;

a cover extending between said gear housing and said end cap; and a damper positioned between said end cap and said second shaft end such that said shaft is prevented from moving axially within said device when said cover is coupled with said end cap and said gear housing.

2. The device of claim 1, wherein said damper has a preassembly dimension and an assembled dimension after said device is assembled, which is smaller than said preassembly dimension.

3. The device of claim 2, wherein said damper is deformed during assembly of said device such that said preassembly dimension changes to said assembled dimension.

4. The device of claim 2, wherein said damper is made from a generally non-elastic material.

5. The device of claim 1, further comprising a first bearing plate adjacent and in contact with said first shaft end and a second bearing plate adjacent and in contact with said second shaft end and wherein said shaft ends have contours that provide single point contact between said shaft ends and said bearing plates.

6. The device of claim 5, wherein said contours of said shaft ends are semispherical and said bearing plates are positioned in a plane that is generally perpendicular to an axis of said shaft and tangent to a portion of said semispherical ends lying along said axis.

7. The device of claim 1, further comprising a threaded spindle member having a gear on one end that is received within said gear housing such that said threaded spindle member extends outward from said gear housing in a direction that is generally perpendicular to said motor shaft, said gear member being engaged with said motor shaft near said first shaft end such that rotation of said motor shaft causes movement of said gear.

8. The device of claim 7, further comprising a moving member received on said threaded spindle member such that said moving member moves axially along said threaded spindle member as said motor causes said shaft to rotate, thereby moving said gear and rotating said threaded spindle member.

9. The device of claim 8, further comprising a link member coupled to said moving member and a seat supporting bracket such that movement of said moving member causes said seat supporting bracket to move in a corresponding direction to thereby adjust the height of the seat.

10. The device of claim 1, wherein said motor shaft ends each include a generally rounded outer contour and said device further comprises a bearing plate adjacent to and in engagement with each said shaft end.

11. A method of assembling a device for adjusting the height of a seat within a vehicle, comprising the steps of:

(a) providing a motor shaft having a first axial end and a second axial end;

(b) placing the motor shaft first axial end within a gear housing;

(c) placing a damper member within an end cap;

(d) placing the end cap over the motor shaft second axial end such that the damper member is generally aligned with an axis of the motor shaft;

(e) deforming the damper member by moving the end cap toward the gear housing; and (f) securing the end cap and the gear housing in the position established in step (e) such that the deformed damper member prevents the motor shaft from moving axially within the device.

12. The method of claim 11, wherein step (f) is performed by placing a cover between said gear housing and said end cap and securing end portions of the cover to the gear housing and the end cap, respectively.

13. The method of claim 11, wherein step (f) is performed by deforming ends of the cover such that the ends engage selected portions of the gear housing and the end cap, respectively.

14. A device for adjusting the height of a seat within a vehicle, comprising:

a seat support bracket adapted to be secured to a base portion of the seat;

a first link member pivotally connected to one end of said support bracket for pivotal movement relative to said seat support bracket about a first pivot axis;

a mounting bracket pivotally supporting said first link member for pivotal movement relative to said mounting bracket about a second pivot axis that is generally parallel to said first pivot axis;

a first moving member coupled to said first link member such that movement of said moving member causes said first link member to move about said second pivot axis, said moving member moving along an axis that is generally perpendicular to said first and second pivot axes;

a first motor assembly including a first motor and a first motor shaft having a longitudinal axis that is generally parallel to said first and second pivot axes, said first motor selectively causing movement of said first moving member by causing said first motor shaft to rotate about said longitudinal axis;

a second link member pivotally connected to another end of said support bracket for pivotal movement relative to said support bracket about a third pivot axis, said second link member being pivotally supported by said mounting bracket for pivotal movement relative to said bracket about a fourth pivot axis, said third and fourth pivot axes being generally parallel to said first and second pivot axes;

a second moving member coupled to said second link member such that movement of said second moving member causes said second link member to move about said third pivot axis, said moving member moving along an axis that is generally perpendicular to said third and fourth pivot axes;

a second motor assembly including a second motor and a second motor shaft having a longitudinal axis that is generally parallel to said third and fourth pivot axes, said second motor selectively causing movement of said second moving member by causing said second motor shaft to rotate about said longitudinal axis; and wherein said movement of said moving members, respectively, adjust a height position of the seat.

15. The device of claim 14, further comprising a second seat support bracket spaced from said seat support bracket and at least one connecting member extending between said seat support brackets and maintaining said second seat support bracket in general alignment with said seat support bracket.

16. The device of claim 14, wherein said first moving member is pivotally coupled to said first link member such that said first link member pivots relative to said moving member about a fifth pivot axis that is generally parallel to said first and second axes.

17. The device of claim 16, wherein said first link member is generally L-shaped and said second and fifth pivot axes are respectively positioned near ends on said link member.

18. The device of claim 14, wherein said motor assembly comprises a motor supported on said shaft such that said motor selectively causes said shaft to rotate;

a gear housing receiving said first shaft end;

an end cap receiving said second shaft end;

a cover extending between said gear housing and said end cap; and a damper positioned between said end cap and said second shaft end such that said shaft is prevented from moving axially within said device when said cover is coupled with said end cap and said gear housing.

19. The device of claim 18, wherein said damper has a preassembly dimension and an assembled dimension after said device is assembled, which is smaller than said preassembly dimension.

20. The device of claim 18, wherein said motor shaft ends each include a generally rounded outer contour and said assembly further comprises a bearing plate adjacent to and in engagement with each said shaft end.

* * * * *